United States Patent [19]
Adler et al.

[11] Patent Number: 4,859,996
[45] Date of Patent: Aug. 22, 1989

[54] TOUCH CONTROL ARRANGEMENT FOR GRAPHICS DISPLAY APPARATUS

[75] Inventors: Robert Adler, Northfield; Mark Fogelson, Wilmette, both of Ill.; Sam Kaplan, Deerfield Beach, Fla.

[73] Assignee: Zenith Electronics Corporation, Glenview, Ill.

[21] Appl. No.: 4,740

[22] Filed: Jan. 20, 1987

Related U.S. Application Data

[63] Continuation-in-part of Ser. No. 698,306, Feb. 5, 1985, Pat. No. 4,700,176.

[51] Int. Cl.$^4$ ............................................. G09G 3/00
[52] U.S. Cl. ................................. 340/712; 333/151; 310/313 D; 310/313 R
[58] Field of Search .................... 340/712; 178/18; 333/150, 151, 156, 157, 158, 195, 239, 248; 310/313 D, 313 R

[56] References Cited

U.S. PATENT DOCUMENTS

| | | | |
|---|---|---|---|
| 3,258,350 | 6/1966 | Martin et al. | 106/47 |
| 3,653,031 | 3/1972 | Hlady et al. | 340/347 |
| 3,673,327 | 6/1972 | Johnson et al. | 178/18 |
| 3,707,489 | 12/1972 | Teichmuller et al. | 260/397.5 |
| 3,775,560 | 11/1973 | Ebelling et al. | 178/18 |
| 3,808,364 | 4/1974 | Veith | 178/19 |
| 3,883,831 | 5/1975 | Williamson et al. | 333/30 R |
| 3,916,099 | 10/1975 | Hlady | 178/18 |
| 3,956,745 | 5/1976 | Ellis | 340/337 |
| 3,978,437 | 8/1976 | Paige | 310/313 D |
| 4,017,813 | 4/1977 | Otto | 310/313 D |
| 4,155,057 | 5/1979 | Sandy et al. | 310/313 D |
| 4,198,623 | 4/1980 | Misek et al. | 340/365 |
| 4,254,333 | 3/1981 | Bergstrom | 250/221 |
| 4,286,289 | 8/1981 | Ottesen et al. | 358/125 |
| 4,346,376 | 8/1982 | Mallos | 340/712 |
| 4,377,840 | 3/1983 | Nail | 361/320 |
| 4,403,165 | 9/1983 | Ballato et al. | 310/313 |
| 4,623,853 | 11/1986 | Watanable et al. | 310/313 D |
| 4,700,176 | 10/1987 | Adler et al. | 340/712 |

FOREIGN PATENT DOCUMENTS 0021548  2/1978  Japan ................................... 333/151

OTHER PUBLICATIONS

Chapman et al.,—"In-line Reflective Array Devices"—Ultrasonics Symposium Preceedings IEEE-Sep./1978-pp. 728-733.

Judd and Thoss, "Use of Apodized Metal Grating in Fabricating Low Cost Quartz RAC Filters", 1980 Ultrasonics Symposium, p. 343.

Adler and Desmares, "An Economical Touch Panel Using SAW Absorption", Zenith Electronics Corporation, Ultrasonics Symposium Preceedings, vol. 1, 1985.

*Primary Examiner*—David K. Moore
*Assistant Examiner*—M. Fatahiyar

[57] ABSTRACT

A system for recognizing touch positions along a predetermined coordinate axis includes a surface wave propagating substrate on which is disposed at least one surface wave transducer. An array of surface wave reflective elements directs the surface wave from the transducer. The reflective elements are composed of a frit material.

6 Claims, 7 Drawing Sheets

IDEAL PROFILE

Fig. 17

REGULAR FRIT

Fig. 18

10% $ZrO_2$ ADDED TO FRIT

Fig. 19

TOUCH CONTROL ARRANGEMENT FOR GRAPHICS DISPLAY APPARATUS

RELATED APPLICATIONS

This application is a continuation-in-part of co-pending application Ser. No. 698,306, filed Feb. 5, 1985 (now U.S. Pat. No. 4,700,176) by Robert Adler, one of the present inventors.

BACKGROUND OF THE INVENTION

This invention relates, in general, to a touch control arrangement for use in graphics display apparatus and, in particular, to a novel arrangement and system for identifying the coordinates of a touch location.

Graphics display apparatus, of the type herein considered, generally utilize a cathode ray tube (CRT), although other types of display devices can be used. In a typical prior art arrangement, each of two adjacent edges of the display surface (faceplate) is provided with a bank of light sources arranged to develop a cluster of parallel light paths which extend across the faceplate, the clusters intersecting, preferably at right angles to form a grid pattern of light paths overlying the display surface. Like banks of light detectors flank those sides of the faceplate opposite the banks of light sources.

In practice, a particular graphic is delivered for display by a controller in response to an operator's command, which command can take the form of a pointing to one area of the faceplate. This pointing serves to interrupt one or more of the light beams, which interruption causes the beam's assigned light detector to develop a signal which is applied to the controller to select a particular graphic. U.S. Pat. No. 3,775,560, for example, exemplifies this type of control for a graphics display apparatus. A touch control arrangement of the type adverted to above tends to be rather costly since a separate light sensor is employed for each light source.

It is known to use surface acoustic wave (SAW) energy for touch control. Prior art U.S. Pat. No. 3,134,099—Woo teaches an arrangement in which a plurality of piezoelectric transducers, electrically connected in parallel, is disposed along each of two adjacent edges of a sheet of glass. The transducers are coupled to the sheet and, in response to a control signal, create surface waves which propagate across the surface of the glass sheet. A writing pen, embodying a piezoelectric component, is placed in contact with the glass sheet to sense a propagating disturbance and then issue an appropriate signal to a control unit which measures the elapsed time interval between the time the control signal was applied to the transducer that initiated the disturbance and the time the signal was received by the pen. It is of significance that, in the Woo arrangement, a plurality of piezoelectric transducers is required for each of two adjacent sides of the glass panel. Further, the Woo system requires the use of a special touch stylus capable of sensing surface acoustic waves traveling across the panel.

U.S. Pat. No. 3,653,031—Hlady, et al is addressed to a touch sensitive position encoder also employing elastic surface wave generating transducers positioned along the edges of a sheet of transparent glass. The transducers function as radiators, as well as sensors, and thus serve to launch surface waves across the glass sheet, as well as to receive such waves. In operation, a finger or stylus placed at a particular position on the glass sheet serves to reflect the surface waves encountered. A reflected wave that is detected is applied to timing circuitry associated with the sensors, which circuitry determines the geometric coordinates of the position of the finger or stylus. Again, as in Woo, two arrays, or banks, of transducers are required to create the surface waves that propagate across the glass sheet.

U.S. Pat. No. 3,673,327—Johnson, et al describes still another SAW-type touch responsive panel assembly comprising a panel positioned over the faceplate of a CRT and having a first plurality of transmitters positioned along a first edge of the panel for generating a like plurality of Rayleigh (surface) beams that propagate across the surface of the panel in an X direction and a like plurality of detectors positioned along the edge of the panel opposite said first edge for individually receiving an assigned one of said plurality of beams. In like fashion, a second plurality of transmitters is positioned along a second edge of the panel, adjacent the first edge, for simultaneously generating a second plurality of Rayleigh wave beams that propagate across the panel in a Y direction, perpendicular to the X direction. A like second plurality of detectors is positioned along the edge of the panel opposite said second edge for receiving an assigned one of said second plurality of beams. Accordingly, to establish this X-Y grid of wave beams, a transmitter is required for each wave beam and a separate detector is required for each such transmitter.

Each transmitter, upon actuation, launches a beam of Rayleigh surface waves along the surface of the panel. Thereafter, when a finger or other object is pressed against the panel, acoustical wave energy is absorbed, thereby interrupting its transmission to its assigned detector. The absence or reduction of the normal signal at a specific detector constitutes a touch indication which is applied to a computer.

However, a principal drawback of the Johnson et al touch control system like that of its optical counterpart, resides in the requirement of a multiplicity of transmitters and detectors to establish the intersecting wave energy paths that form the grid overlying the panel. The mechanical considerations, and cost, involved in the practice of utilizing dual pluralities of transmitters and detectors, all of which must be separately wired, are obvious shortcomings.

Other patents in the touch control art are set forth below:
U.S. Pat. Nos. 3,775,560
3,808,364
3,916,099
3,956,745
4,198,623
4,254,333
4,286,289
4,346,376

Additionally, art in the field of surface acoustic waves which was considered included:
U.S. Pat. Nos. 3,883,831
4,403,165
"Use of Apodized Metal Gratings in Fabricating Low Cost Quartz RAC Filters" by G. W. Judd and J. L. Thoss. Proceedings of the IEEE 1980 Ultrasonics Symposium, p. 343.

OBJECTS OF THE INVENTION

It is therefore a general object of the invention to provide an improved touch responsive graphics display apparatus.

It is a specific object of the invention to provide an improved touch responsive arrangement for, or for use with, a graphics display CRT.

It is also an object of the invention to provide a touch responsive arrangement for use with graphics display apparatus which imposes but minimal limitations on cabinet and escutcheon designs.

It is another object of the invention to provide such a touch responsive arrangement characterized by minimal mechanical and electrical complexity and reduced cost of manufacture.

BRIEF DESCRIPTION OF THE DRAWINGS

The features of the present invention believed to be novel are set forth with particularity in the appended claims. The invention together with further objects and advantages thereof, may best be understood by reference to the following description taken in conjunction with the accompanying drawings, in the several figures of which like reference numerals identify like elements, and in which:

Figure 1:
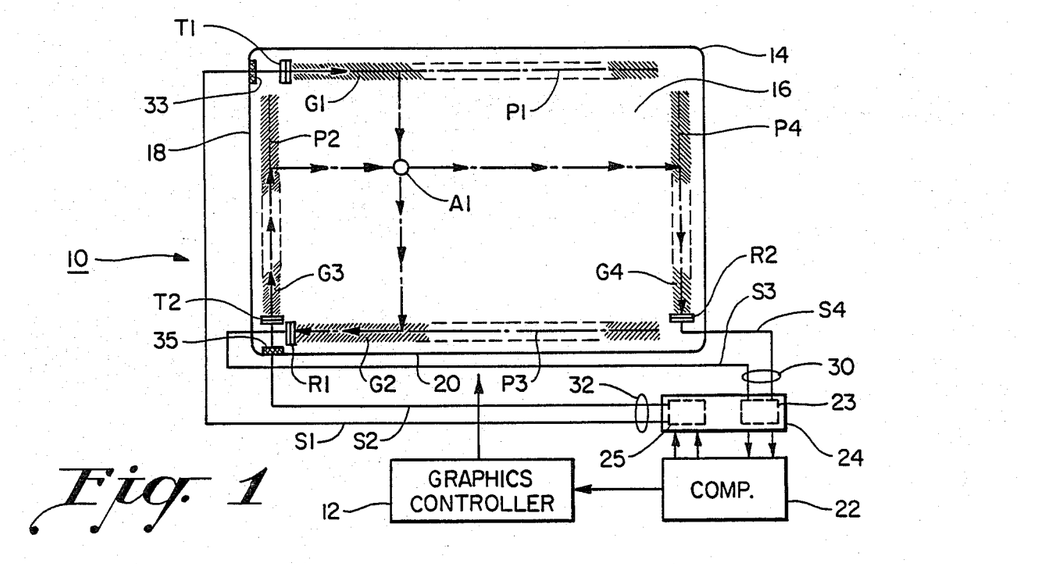
FIG. 1 illustrates, partially in schematic form, a graphics display apparatus embodying the invention.

FIG. 1 shows a graphics display apparatus 10 comprising a graphics controller 12 and a display device 14 having a display surface 16. A CRT may be employed to display graphics and the subject invention will be described in that environment. However, it is to be appreciated that the invention is readily applicable to other display devices, e.g., electroluminescent or liquid crystal devices, or even displays as simple as an elevator number display, any of which can be employed in lieu of a CRT. In some applications, a separate panel is disposed over the faceplate of the display device.

The faceplate, or panel, is commonly designated a "touch control panel" since graphics, or other information may be ordered up for display from controller 12 in response to an operator's command which can take the form of a touching of a particular area of a menu associated with the touch control panel. This display surface 16, whether it can be a CRT faceplate or a separate panel, constitutes a substrate the surface of which is capable of propagating surface acoustic waves. As will be shown, the act of touching serves to interrupt or reduce wave energy directed along one or more paths that form a grid overlying the panel. Detection and analysis of such interruption serves to identify the X, Y, or other coordinates of the touched area, which information, in turn, is determinative of the graphics to be delivered up for display or other response of the device.

To this end, apparatus 10 further includes a computer 22 for rendering an interface circuit 24 operative in a predetermined sequence so that when a perturbation, or interruption of acoustic wave energy is detected, converted to an electrical signal and fed back to the computer, via interface circuit 24, the location of the interruption is identifiable by the computer. Graphics controller 12 comprises the drive electronics for CRT 14 and, to that end, serves to amplify and otherwise condition the output of computer 22. To achieve its functions, the computer comprises a clock (source of timing signals), a source(s) of video information, as well as sources of horizontal and vertical sync pulses. The output of controller 12 is coupled to the control electrodes of CRT 14, as well as to the CRT's deflection windings, to display, under the direction of computer 22, selected graphics. Accordingly, when the computer identifies the location, or address, of wave interruptions, it will then output the appropriate information to controller 12 to change the video display to graphics associated with the address touched by the operator.

As shown in FIG. 1, interface circuit 24 has input terminals coupled, via a buss 30, to receiver transducers R1, R2 and output terminals coupled to transmitter transducers T1, T2 via the buss 32. Circuit 24 has additional input and output terminals coupled to computer 22 for interacting therewith. Circuit 24, in response to timing signals from computer 22, outputs firing signals that stimulate transducers T1, T2 in a timed sequence so that the location of a subsequent interruption of a surface wave is identifiable.

Input transducers T1, T2, which are more particularly described below, are mounted upon substrate surface 16 adjacent to edges 18 and 20, respectively, of FIG. 2. A source 25 in interface circuit 24 serves to apply input signals S1, S2, via buss 32, to respective transducers T1, T2, which transducers, in response thereto, individually launch a burst of acoustic surface waves along first and second paths P1, P2, respectively on surface 16.

Figure 2:
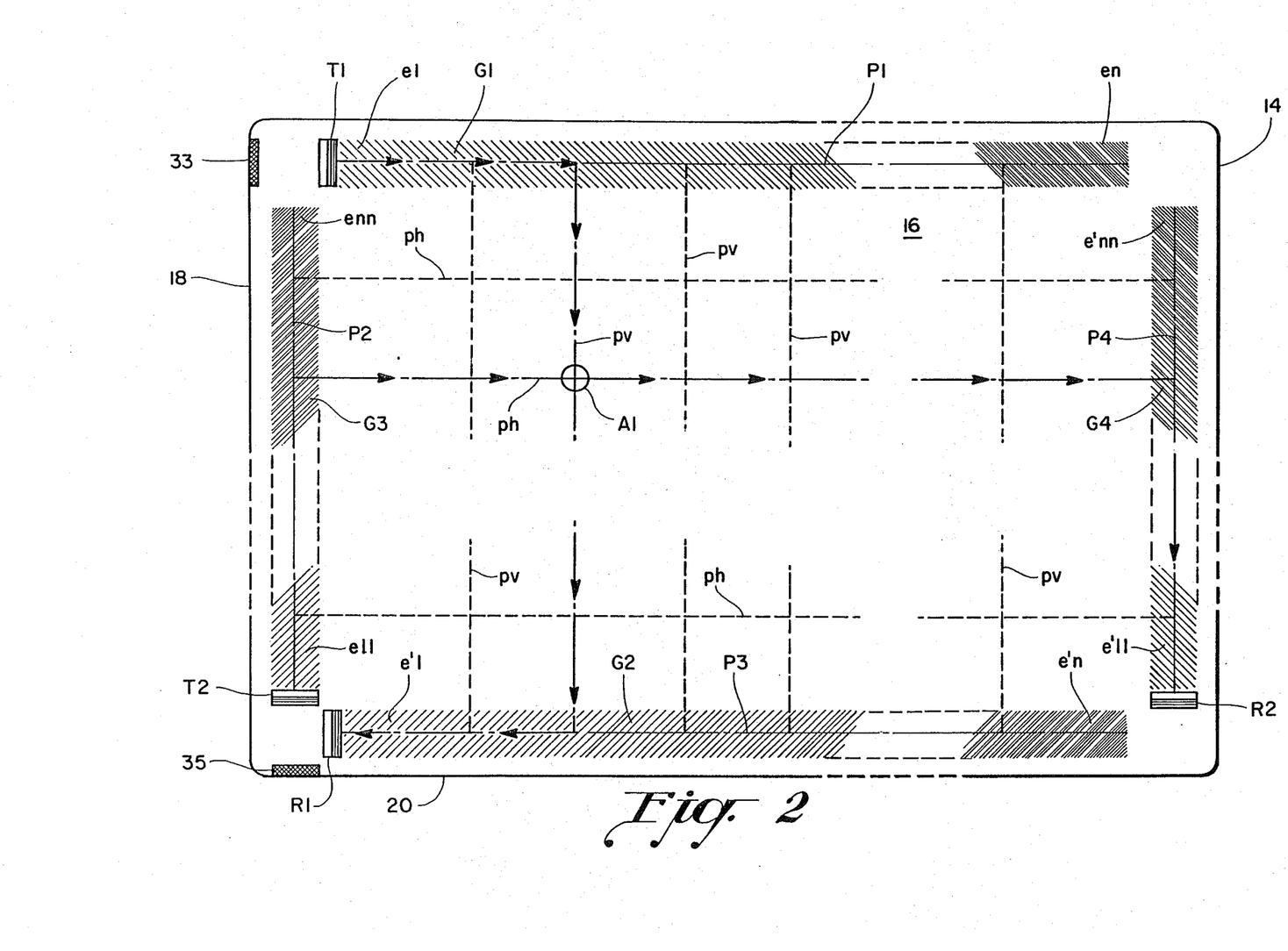
FIG. 2 is a plan view of the FIG. 1 touch responsive display panel depicting, in some detail, reflective grating construction and placement.

Also as shown in FIG. 2, first and second output transducers R1, R2, are mounted upon substrate surface 16 adjacent to respective edges 18, 20 that is, the edges close to their associated input transducer T1, T2. In a manner to be detailed below, transducers R1, R2, upon receipt of the surface waves launched by their associated input transducers develop respective output signals S3, S4 which, upon analysis, will exhibit a characteristic of the launched surface wave, e.g. a change in amplitude, attributable to a perturbation of a received surface wave burst.

A first reflective grating G1 comprising an array of reflective elements el–en is disposed along path P1 with each of the aforesaid elements effectively arranged, preferably, at like angles of incidence to the longitudinal axis of path P1. Desirably, the angles of incidence of the reflection elements, relative to the axis of path P1, are approximately 45 degrees. Additionally, the longitudinal axis of path P1 is preferably disposed parallel to the upper edge of substrate surface 16, as viewed in FIGS. 1 and 2.

Reflective elements el–en serve to extract from the initially launched surface wave burst a multiplicity of wave components and to direct such wave burst components across substrate surface 16 along a like multiplicity of paths pv each disposed at an angle to the axis of path P1. As depicted in FIGS. 1 and 2, these multiplicities of paths are each disposed at 90 degrees to the axis of path P1.

A second reflective grating G2 likewise comprises an array of reflective elements 3'1–e'n which are disposed along path P3 and are effectively arranged at like angles of incidence to the longitudinal ais of path P3 for intercepting the wave components extracted from the wave traversing path P1 and directed across substrate surface 16 along the paths pv. Grating G2 intercepts the wave burst components arriving along paths pv and redirects them along path P3 toward receiving transducer R1 which converts the wave energy in a received burst to an electrical output signal S3. In a fashion complementary to that of the first reflective grating G1, the elements of grating G2 are disposed at 45 degrees to the longitudinal axis of path P3 to facilitate interception and redirecting of wave components arriving from grating G1.

The above-described transducer pair T1, R1 and gratings G1, G2 serve to establish one portion of a grid of surface wave burst paths pv which are disposed across substrate surface 16. A second portion of that grid is established by a second pair of transducers T2, R2 and associated gratings G3, G4. In a manner similar to that described above, transducer T2, in response to a firing signal S2 from source 25 in interface circuit 24, launches a burst of acoustic surface waves along the path P2, which path is disposed perpendicular to the previously described paths P1, P3. The third reflective grating G3 comprises an array of reflective element ell–enn which are disposed along path P2 with the elements effectively arranged at like angles of incidence to the axis of path P2. Grating G3 serves to extract from the surface wave launched by transducer T2 a multiplicity of wave burst components and to direct such wave burst components across substrate surface 16 along a multiplicity of paths ph each disposed at a 90 degree angle to the axis of path P2.

A fourth reflective grating G4, comprising an array of reflective elements e'll–e'nn is disposed along path P4, each element being arranged at a 45 degree angle to the longitudinal axis of path P4. The reflective elements of grating G4 intercept the wave components directed thereto by the elements of grating G3 along the paths ph and redirect these intercepted wave burst components along path P4 to receiving transducer R2.

Since transducers T1, T2 additionally launch surface acoustic waves along paths P1, P2 in directions opposite from their respective adjoining gratings G1, G3, it is desirable to provide means for arresting such wave energy. Accordingly, a pair of absorbers 33, 35, which can be formed of a soft epoxy, are mounted upon the display surface immediately behind respective transducers T1 and T2.

In the manner just described, and as depicted in FIG. 2, display surface 16 is now provided with an overlying grid comprising a multiplicity of intersecting paths of acoustic surface wave bursts which surface waves are confined to predetermined paths, one series ph being disposed parallel to what may be termed the horizontal or major axis of display surface 16 while a second, intersecting series of paths pv are disposed parallel to the vertical or minor axis of the display surface. In this fashion intersecting wave energy paths traverse the surface of the display device, forming a grid that overlies display surface 16.

As described above, means, in the form of interface circuit 24 and buss 32, are coupled to the input transducers T1, T2 for initiating the launching of bursts of surface waves along paths P1, P2. The application of signals S1, S2 to transducers T1, T2 serve to generate and launch across surface 16 elastic (ultrasonic) surface waves having a substantially planar wavefront with uniform amplitude and phase along lines parallel to the initiating transducer. Transducers T1, T2, (as well as R1 and R2) typically, are piezoelectric transducers comprised of a lead zirconate-titanate ceramic mounted upon a prism of lower velocity material, e.g., Lucite, which effects an efficient electro-mechanical coupling to substrate surface 16.

The generated surface waves launched along paths P1, P2 are eventually received by transducers R1, R2, respectively, and converted to electrical signals S3, S4. Means comprising a signal processing circuit 23, included in interface circuit 24, see FIG. 1, is coupled to the outputs of receiving transducers R1, R2 for determining, by an analysis based on the transit time of the perturbed surface wave burst, which of paths ph, pv the touch-perturbed wave traversed and thereby establish the location of the touch along two coordinates of the display surface. In one coordinate system, for example, in order to identify the X coordinate for the location of the path of a perturbed wave burst along the horizontal axis, as viewed in FIG. 2, the determining means is arranged to make a time analysis of the surface wave burst received by transducer R1. To this end, the determining means analysis commences at the instant input signal S1 is applied to transducer T1 to launch a surface wave. On the time scale of FIG. 3 there is plotted the earliest time an acoustic wave burst from transmitter T1 could arrive at receiver R1.

Assuming that the dimensions of the grid overlying display surface 16 are approximately 8"×11", and assuming further that the transit time required for a surface wave burst to reach the first reflective element el on path P1 is approximately 2 microseconds, as is the transit time required for the surface wave burst to travel to receiver R1 from element e'1; to this is added the transit time of the surface wave from reflective element el across the display surface 16 to element en, which is approximately 6 microseconds. Accordingly, the detector will ignore any disturbance arriving within the first 64 microseconds immediately following the triggering of transmitter T1. Assuming for the moment, that no disturbance or perturbation of the instant surface wave launched by T1 is experienced, the output of transducer R2 might exhibit the solid line response shown in FIG. 3. Depicted therein is a waveform having a relatively constant amplitude extending for approximately 176 microseconds. This response is established by virtue of the fact that for a period commencing at to surface wave energy is continually received by the detector R1 for 176 microseconds that is until time tn. The 176 microseconds interval is the approximate time required for a surface wave to traverse the entire length of reflective grating G1 and return along the length of reflective grating G2. In the absence of a perturbation the output of receiver transducer R2, when analyzed by interface circuit 24, will supply a signal to computer 24 which is indicative of the fact that an uninterrupted burst of surface waves traversed substrate surface 16 without interference. The computer relays this information to controller 12 which, in turn, maintains the graphics display on the CRT undisturbed.

Assuming now that an operator wished to select a graphic other than that being displayed. A menu, such as a chart or other type of directory, would indicate which particular area of display surface 16, should be touched to call up the desired graphic. Accordingly, assuming that the particular area is that designated A1 in FIG. 2, the operator then inserts his finger into the grid of intersecting surface waves by touching the display surface at A1, which action causes a portion of the acoustic surface wave energy traversing the touched area to be absorbed. This act of touching is best explained, and manifested, by reference again to FIG. 3 which depicts the effect upon the output waveform of R1 attributable to a perturbation of the surface wave traversing the display surface in the vicinity of area A1. This effect is manifested in the waveform as a dip D1 along the time axis which corresponds to the point where the operator touched the panel. Let us assume that the point of touch occurred approximately one-fourth of the distance along the major axis of the display surface commencing from the left side, as viewed in FIG. 2. As previously noted, it was assumed that the time entailed for a surface wave to travel the length of grating G1 was 88 microseconds. One-fourth of that time would be 22 microseconds. Adding to that number the 64 microseconds required for the wave to traverse the paths parallel to the minor axis of the surface, the 22 microseconds entailed in traversing a corresponding portion of array G2, and finally adding the 4 microseconds (2+2) initial and terminal transit times, the detector, output waveform would indicate that a perturbation of the wave burst transmitted by T1 and subsequently received by R1, occurred approximately 112 microseconds (2+2+64+22+22) after the transmitter T1 launched the surface wave under consideration. This 112 microsecond interval is analyzed by computer 22 which informs the controller 12 that a perturbation was detected by receiver R1 at a particular instant in the time domain.

Preferably, a short time later, a surface wave burst is launched by transmitter T2 and reflected by gratings G3 and G4 to return the components of that wave to receiver R2. In the manner described above with reference to a perturbation detected by R1, the surface wave components now traversing a path ph parallel to the major axis of the display surface are detected by R2 which establishes, in like fashion, the occurrence and time when the aforementioned perturbation of the wave, manifested in FIG. 4 as dip D2, was experienced along the Y-axis. Applying this time-related information to that developed relative to the other axis, the computer informs controller 12 of the coordinates of the perturbation (touching A1) so that the controller may deliver for display upon the CRT screen the particular graphics associated or assigned to the location at which the touching occurred.

It is recognized that simultaneous operations to identify both coordinates are possible, but the preferred mode of operation is to alternate between the two. The latter practice eliminates crosstalk problems and makes it possible to economize by switching certain circuit elements (e.g. a tuned amplifier) between coordinate identifying channels, instead of duplicating such elements.

In an embodiment successfully reduced to practice the above-described gratings G1–G4 were formed by resort to a silk-screening technique in which a frit (solder glass) material, in accordance with one aspect of this invention, is substituted for the conventional ink in the otherwise well known printing process. Specifically, a tensioned cloth or metal mesh screen is impregnated with photo-resist and photo-exposed to form a negative of the desired reflector grating pattern. The photo-resist is insolubilized by such exposure. Subsequently the unexposed photo-resist material is dissolved and washed away, and a paste of high density glass frit in an organic binder material is printed onto the display surface 16 through the resist-free areas of the screen to form a pattern corresponding to the gratings G1–G4. In order to closely control the thickness, uniformity and line width of the gratings, the frit is in the form of powder particles milled to submicron size with a density of about 6 grams per cc. These frit particles are then mixed with an approximately 10% nitrocellulose-terpineol solution to form a viscuous paste. This frit paste, when printed, is in the form of a somewhat viscous liquid. The latter must then be baked at temperatures of 400–500 degrees C. until the organic binder vaporizes and the frit melts and then devitrifies, forming a solid mass and becoming bonded to the display surface 16. This general procedure is set forth in an article entitled "An Economical Touch Panel Using SAW Absorption" by Robert Adler and Peter J. Desmares, published in the 1985 Ultrasonics Symposium Proceedings, Vol. 1.

It has been found, however, that conventional high density frit formulations (which have high lead-concentrations) are subject to certain disadvantages when used for printing the gratings G1–G4. The viscocity of such formulations is not great enough to permit the printed lines el, etc. to hold a sharp edge during the time that the frit material is being baked. Consequently, during that period of time each of the frit lines el, etc. tends to slump, spread, and flow; changing the shape of its sound-reflecting edge from a nearly vertical wall to a gradual slope. This change of shape adversely affects the sonic reflectivity of the gratings G1–G4, and thus impairs the performance of the SAW touch-screen system. Specifically, if the edges of the lines el, etc. are not sharp, the sonic reflections therefrom are more diffuse, and the strength of the reflections is less because more of the sound energy is lost.

One aspect of this invention, which was developed to overcome the foregoing problem, is the addition of a nucleation-accelerating agent to the frit composition to enable the lines el, etc. to hold a sharp edge. In order for such an additive to retain its nucleation-accelerating properties during the baking operation, it should be refractory material. For example, if about 10% by weight of zirconium oxide ($ZrO_2$) powder is added to the frit composition to increase its viscosity, it enables the grating lines to hold a sharp edge during the baking operation until the frit crystallizes and hardens. After that, slumping, spreading and flowing can no longer occur.

The addition of 10% zirconium oxide to a frit composition is not in itself new. See Martin, U.S. Pat. No. 3,258,350, in which such an additive is disclosed, and its nucleation-accelerating effects recognized. (See also Mason, U.S. Pat. No. 3,707,489 and Nair, U.S. Pat. No. 4,377,840). The Martin patent, however, leads the art away from the teaching of the present invention, because Martin used zirconium oxide as an additive only to modify the coefficient of thermal expansion of a frit composition, and regarded the concomitant increase in nucleation as an undesirable side effect. In any event, the use of a zirconium-oxide-impregnated frit material in the specific environment of a SAW touch-screen goes far beyond the disclosure of the Martin patent.

Studies of grating lines formed with a 10% zirconium-oxide-impregnated frit composition according to this invention have shown that the profiles of such lines are substantially sharper and the echoes therefrom substantially stronger, thus improving the operation of the present SAW touch-screen system. The zirconium oxide additive may also increase the density of the frit material, and the denser the material of the grating lines el, etc. is, the less height they must have to return an echo of a given amplitude.

The following is a practical example of a method of printing a SAW reflection grating in accordance with this invention:

Step 1. Owens Illinois CV 810 HD frit powder is vibromilled to achieve approximately 0.5 micron average particle size.

Step 2. A paste containing 100 parts by weight of the milled frit, 35 parts by weight of 10% nitrocellulose terpiniol binder, and 10 parts by weight of zirconium oxide ($ZrO_2$) powder was made by milling or roller-milling to achieve homogeneity.

Step 3. Using that paste as an ink, the array pattern was printed on a glass substrate by the silk-screening method using a 260 mesh screen.

Step 4. The glass with the array pattern was baked at a peak temperature of 430 deg. C. for 20 minutes.

The final frit pattern coating thickness after baking was approximately 0.2 mils. This thickness can be changed by adjusting the viscosity of the frit paste through varying the binder content as follows:

| BINDER PER 100 PARTS OF FRIT | THICKNESS IN MILS |
|---|---|
| 45 | .1 |
| 35 | .2 |
| 25 | .4 |

Figure 17:
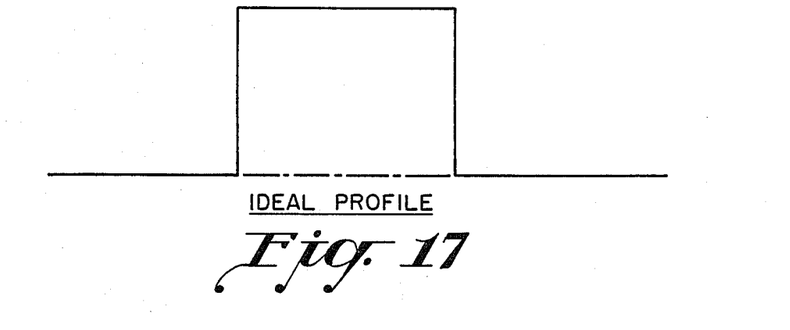
FIG. 17 is a cross-section of an idealized profile of an element of a reflective grating.
Figure 18:
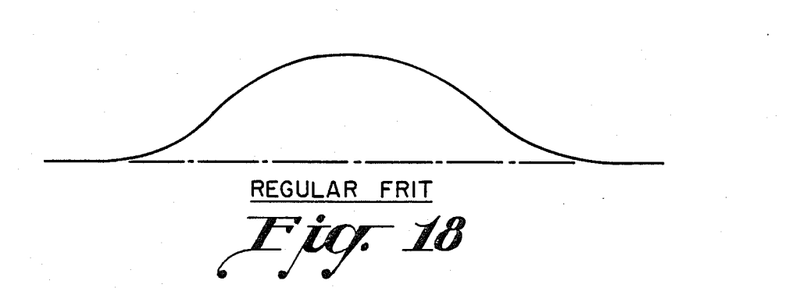
FIG. 18 is a profile of a prior art reflective grating element.
Figure 19:
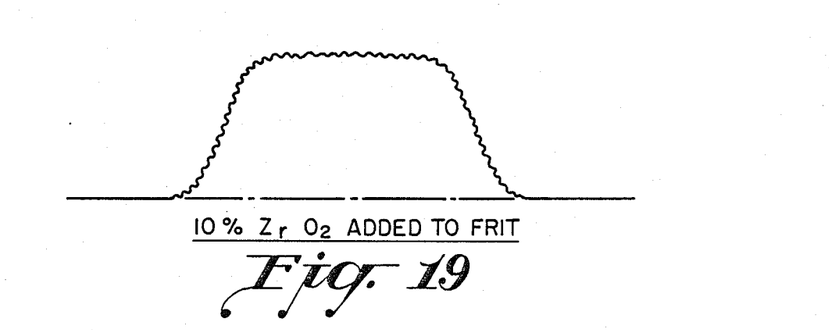
FIG. 19 is a profile of a reflective grating element to which a nucleation-accelerating agent has been added.

The effect of adding the zirconium oxide to accelerate nucleation and to reduce flow during the frit heating cycle is illustrated in FIGS. 17–19. FIG. 17 shows an ideally sharp rectangular profile for each of the grating elements, el etc. Such a profile, however, cannot be achieved in practice. If conventional frit compositions are used, viscous flow during the bake operation causes the grating elements to slump into a gradual profile of the kind seen in FIG. 18. A much better profile as illustrated in FIG. 19 and this is achieved by means of the 10% $ZrO_2$ additive. There is much less viscous flow during bake, and therefore less slumping, resulting in the much more nearly rectangular profile of FIG. 19.

The frit reflector grating was deposited in the pattern depicted in FIG. 2. More particularly, the actual configuration and spacing of the grating element pattern was computer-generated utulizing the finger-withdrawal method. Consider first a basic reflective linear array comprising a multiplicity of surface wave reflecting fingers (elements) of equal width, equally spaced and collectively disposed at 45 degrees to the longitudinal axis of the path they define. Desirably, the spacing, or pitch, between adjacent elements should be one wavelength of the frequency of the burst of acoustic waves launched by the transmitting transducer. An acoustic wave traversing such an array in which the reflecting fingers are uniformly spaced will experience an exponential attenuation of power with distance so that little, if any, acoustic wave energy is available for reflection at the terminus of the array. Moreover, a uniform array of the type adverted to results, of necessity, in exponentially decreasing power density with distance in the reflected acoustic wave components directed across the display surface. In other words, the power density of the initially reflected wave components will be significantly greater than that of subsequently reflected wave components. Desirably, the reflected wave components traversing the display surface should be characterized by a substantially constant power density, as graphically depicted in FIGS. 3 and 4, otherwise those plots would depict an exponentially decreasing amplitude.

The desired constant power density of the reflected waves is achieved, in an execution that has been reduced to practice, by a patterned deletion of a grating's reflective elements in which the percentage of deleted elements decreases gradually from the launch point to the terminus of the grating. This results in a progressively increasing coefficient of reflectivity culminating in the sought for constant power density.

A reflective grating tailored for the above-mentioned execution was designed from an initial array of approximately 300 equally spaced elements having a pitch (in the direction of wave propagation) of one wavelength of a four MHz acoustic wave. In practice elements are selectively deleted to the end that the spacing between remaining adjacent elements in the grating is a multiple of the above-mentioned one wavelength. In the subject execution array elements are selectively deleted in accordance with the following formula:

$$\rho = \sqrt{\frac{C-1}{C\exp\left(\frac{x}{L}\right)-1}}$$

In the above expression, P is equal to the density of elements at coordinate x, where x is the distance measured from the far end of the array back toward the launch end. When x equals zero, element density is unity, which is the case for a uniform array with no elements deleted. C and L are constants, the values of which are determined by recourse to experimental data and depend upon the material properties of the display panel and the reflective elements, the length, width and thickness of the reflective elements, etc. The resulting grating comprised an array of approximately 130 elements having a pattern determined by the above formula and in which individual elements were 0.7" long and 0.011" wide.

Having described a preferred embodiment of the invention, a number of the principles underlying the invention and variants of the preferred embodiment will be discussed. Whereas the preferred embodiment of the invention is illustrated as providing for touch position detection in Cartesian coordinates, it should be understood that the principles of the invention are applicable in devices having angular or other coordinate systems, or in devices having a single coordinate axis.

The preferred embodiment has been described in the context of a system for launching a burst of surface waves into a reflective array or grating from which is derived a plurality of burst components. The array redirects these components across the display surface. In a broader sense, the invention may be thought of as surface acoustic wave scanning means including input surface wave transducer means coupled to a surface wave propagating substrate for scanning the surface in the direction of the coordinate axis with a timed succession of surface wave bursts directed in substantially parallel paths across the surface transversely to the said coordinate axis. The plurality of paths are respectively associated with different positions along the coordinate axis of the display surface. As the touch position information is developed by timing the surface wave burst component which is perturbed, the starting time of each of the succession of surface wave bursts which are directed across the panel must be carefully controlled. In the aforesaid preferred embodiment, the timing is inherent in the propagation velocity of the surface wave burst as it travels through the reflective grating. Other embodiments are contemplated wherein the launching of the bursts of surface waves or wave components along parallel paths across the panel is determined by other than the natural propagation velocity of surface waves on the display surface. For example, in the embodiment wherein a reflective array such as is shown in FIG. 2 is used to launch the surface wave burst components across the panel, the reflective array may be formed on a separate strip composed of a material having a different wave propagation velocity, such as a different glass or a metal, which is adhered to the display surface. Care must be taken to insure an efficient transition of the waves from the reflective grating onto the display surface, as by feathering the interfacing edge of the strip. The wave reflective array may be formed on a separate strip for other reasons also, such as ease or economy of manufacture.

In a broad sense, the invention may also be thought of as an absorption ranging system, quite unlike the above-discussed reflection-type ranging system shown in the prior art Patent No. 3,653,031. In the present invention, the absence of wave energy or the presence of wave energy at a reduced level, as results when a finger, or a stylus reasonably capable of absorbing acoustic surface wave energy, damps the amplitude of a surface wave burst propagating through the region of the touch, is sensed and the timing of that information is utilized to determine which of the plurality of burst propagation paths has been perturbed, and thus the location of the touch. One will note that in the preferred embodiment, the time required for the surface wave burst components to propagate across the panel is constant for all burst paths. However, the time required for the surface wave burst launched by the input transducer to propagate to the point at which it is again redirected across the panel, and from the point at which it is redirected to the output transducer, varies along the coordinate axis along which the touch may occur. It is this varying distance, and the surface wave propagation time associated therewith, which is used in the present invention to locate the position of a touch along the coordinate axis.

Unlike prior art systems which have a fixed number of emitters along one side of the touch panel and a corresponding fixed number of detectors along the opposed side thereof and which detect the position of a touch by determining which of the emitter-detector pairs have been triggered, the present invention teaches the formation of a continuous succession of surface wave bursts which sweep across the panel and develop at the output an analog output signal. With the present invention, a touch panel system designer has a free choice, by detection circuit design, to pick touch panel specifications conforming to the specifications of a device driven by the display—a computer, for example—without making mechanical changes. This subject will be treated at length below.

Figure 5:
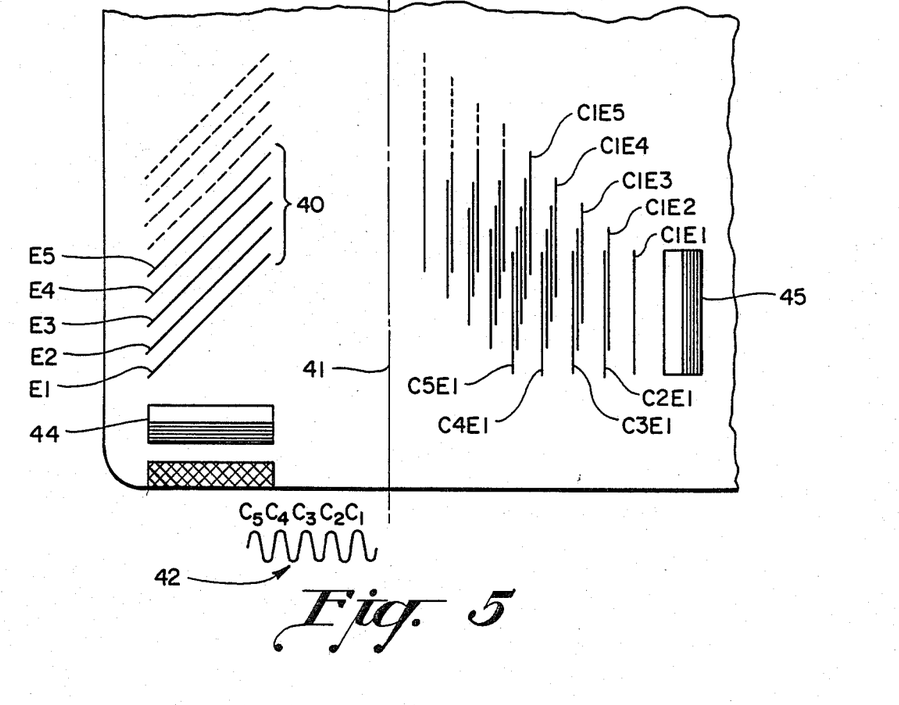
FIG. 5 is a schematic representation of a reflection grating and a series of reflected wave components developed by that grating.

FIG. 5 will further an understanding of certain principles underlying the present invention, and certain desired optimizations. Whereas other means may be devised for redirecting a burst of surface waves launched by the input transducer across the display surface, as in the preferred embodiment described above, FIG. 5 shows a reflective grating 40 for this purpose. The grating is shown as comprising reflective elements E1, E2, E3, E4, and E5 arranged in the direction of the touch coordinate axis 41. In practice, the grating would comprise additional elements as shown in FIG. 2, however, in the interest of clarity of illustration, only five elements are shown. An input signal 42 for application to the schematically represented input transducer 44 is shown as comprising a five cycle signal burst, here depicted as a sine wave having cycles C1, C2, C3, C4 and C5.

Application of input signal 42 to the input transducer 44 results in a burst of equal-amplitude surface waves from the transducer 44. The wavelength of the cycles C1–C5 is selected to be equal to the period of the grating 40. The first cycle C1 of signal 42 generates a first surface wave which is partially reflected from the first element E1 of grating 40, here shown by way of example as being oriented at 45 degrees to axis 41. The reflected surface wave propagates at 90 degrees to the direction of travel of the launched surface wave. The first reflected surface wave is labeled in FIG. 5 as C1E1, signifying the first surface wave developed by input signal cycle C1, as reflected from grating element E1.

The same first wave reflected from grating element E2 is shown in FIG. 5 at C1E2. The surface waves reflected from elements E3-E5 are labeled C1E3, C1E4 and C1E5, respectively. Similarly, the second cycle C2 of the input signal 42 develops a second surface wave which lags the first surface wave by one period, producing a second pattern of surface waves of exactly the same configuration as the pattern of waves produced by the first cycle C1 of the input signal, but lagging in time by one cycle. Similarly, input signal cycles C3-C5 produce three more surface wave patterns. Thus, the application of input signal 42 results in a burst of surface waves from the input transducer 44 which propagate through the reflective grating 40. A plurality of surface wave burst components are derived from the grating 40 which propagate across the display surface. As used herein, C1E1, C2E1, C3E1, C4E1, C5E1 constitutes one burst component. Another would be C1E2, C2E2, C3E2, C4E2, C5E2. It is preferred that the burst components be heavily overlapped to produce at the output a smooth analog signal, as will be discussed at length below.

Figure 6:
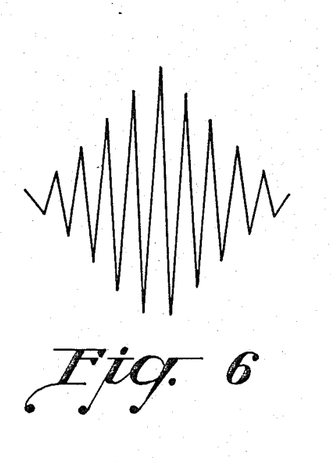
FIG. 6 illustrates the waveform developed by an output transducer responding to the reflected wave components shown in FIG. 2.

The output developed by an output transducer 45, positioned as shown in FIG. 5, will take the form shown schematically in FIG. 6 wherein the amplitude of the detected signal will rise to a peak and then decay to zero. This can be easily understood from FIG. 5 wherein it can be seen that the burst of surface waves is led by single wave C1E1, which is followed by a double wave C1E2, C2E1 in turn followed by a triple wave, and so on. After the peak is reached, the number of surface waves which add at the output progressively decreases until the burst has passed and the detected wave energy falls to zero.

It has been discovered that if signal/noise ratio is considered, there exists an optimum relationship of surface wave burst length to input transducer width (or more precisely, width of gratings G1, G2 etc.). Specifically, in a preferred execution of the present invention, the duration of the input surface wave burst ("T") emerging from the input transducer should be in the range of 1.0 w/c to 2.0 w/c where "w" is the above-mentioned width and "c" is the velocity of propagation of surface waves on the conducting substrate.

Figure 7:
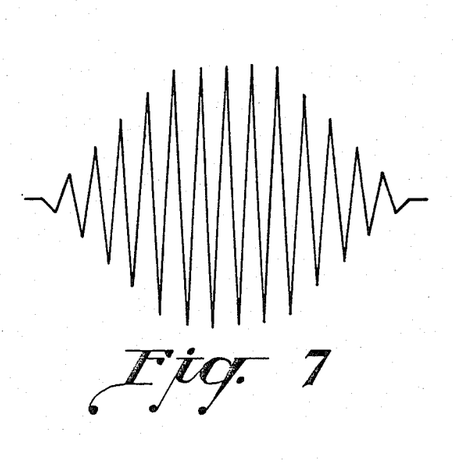
FIG. 7 illustrates the waveform developed by an output transducer responding to an elongated series of reflected wave components.
Figure 8:
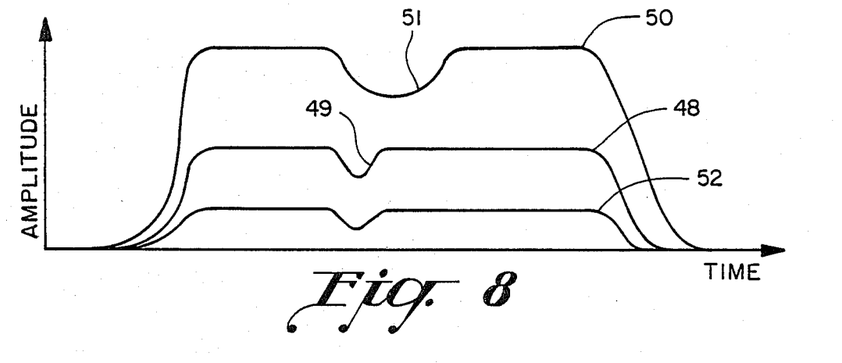
FIG. 8 is a schematic representation of a rectified version of the output signal of an output transducer employed in a touch panel display apparatus constructed in accordance with the invention.

The implications of the above can be better understood by reference to FIG. 8 which is a highly schematic representation of a rectified version of the wave form of a signal which might be produced at the output of the output transducer in touch panel display apparatus according to the present invention. FIG. 8 is a schematic illustration corresponding to FIG. 3 or 4 discussed above. Using an optimized configuration, as described above, an output signal 48 results in which the amplitude dip 49 resulting from a damping of a burst of surface waves in a particular burst path has substantial amplitude. The signal to noise ratio of the signal 48 is adequate. The dip 49 in the waveform of the rectified signal 48 corresponding to the detected damping of the wave has a well-defined bottom which can be located with extreme precision, as will be discussed below. If the length of the input burst of surface waves is substantially above the optimum range, the output transducer will develop an output signal having an envelope with an excessively elongated trapezoidal shape, as shown schematically in FIG. 7. In FIG. 8, the waveform 50 represents the type of rectified output which would result—namely an output signal having a dip 51 associated with the perturbation which has a poorly defined bottom and thus poor touch resolution. Conversely, if the input burst of surface waves (the duration of the input signal 42) is significantly shorter than the optimum length, a weak signal will result such as shown in FIG. 8 at 52, with lower signal-to-noise ratio and thus a signal whose reliability and touch resolution is poor. It is the signal-to-noise ratio of the signal developed at the output transducer which determines the limiting touch resolution in the present system.

By way of example, the spacing of the grating elements and the wavelength of the surface waves which make up the surface wave bursts may, for example, be thirty mils (0.030"). In determining the optimum input burst length in accordance with the present invention, one factor which must be taken into account is the distance the surface waves will travel across the panel without significant spreading due to diffraction effects. As a rule of thumb, a surface wave will propagate from its launching transducer a distance roughly equal to the square of the width of the transducer, measured in number of wavelengths, without excessive spreading. By way of example, to launch a surface wave across a fifteen inch wide panel, the input transducer should be about twenty-four wavelengths wide. Assuming a thirty mil wavelength, the surface wave burst will travel approximately 576 wavelengths or about seventeen inches before significant spreading occurs. In practice, however, it has been found that for a fifteen inch panel width, the transducer need only be about 16 wavelengths (0.48 inches) wide; this favorable finding is explained by the simultaneous action of two gratings (e.g. G1 and G2) in determining the wave paths across the display surface. Now, if the surface wave velocity on the display surface is 120 mil per microsecond (=3000 meter/second), then w/c equals 4 microseconds, and consequently the optimum burst duration is between 4 and 8 microseconds, corresponding to the range of 16 to 32 cycles. The frequency corresponding to these figures, determined by the quotient of velocity c and wavelength, equals 4 Megahertz.

It is important to note that with bursts as long as 32 cycles passing through the grating, maintaining the correct relationship between the transmitted frequency and the mutual spacing S of the reflecting strips is important. In the embodiment described so far, the strips are oriented at 45 degrees to the direction of the incident wave, and the proper spacing for this case is one wavelength or an integral number of wavelengths; the correct frequency is f=C/S or an integral multiple thereof, and the transmitted frequency should be very close to the theoretical value; for shorter bursts, i.e. those containing fewer cycles, frequency tolerance is proportionately wider. Power reflectivity, to be defined later, must also be determined at the correct frequency. For the same reason, it is important that the chosen value of S be accurately maintained constant along the entire grating, with the exception that integral multiples of S are allowed.

As intimated above, the present invention is distinguished from other touch panel systems, in its preferred form, in its particular utilization of an analog output signal. In accordance with an aspect of this invention, circuit means are provided which are coupled to the input and output transducer means for initiating a timed succession of surface wave bursts, or burst components, on the display surface and for detecting touch-induced perturbations of received wave bursts, the circuit means including means for rectifying the output from the output transducer means to develop an electrical characterization of the perturbation and for developing an output representing the timing of said characterization of said perturbation. From that output, it is determined which of the plurality of paths was traversed by the touch-perturbed wave burst and thereby the location of the touch along the coordinate axis of the display surface.

A number of arrangements are contemplated for analyzing the output signal to determine the timing of the wave burst perturbation. In a preferred embodiment, means are provided for sampling the amplitude of the rectified output from the output transducer at a plurality of time spaced points. Means are provided for storing the amplitude samples for future reference. During a touch of the display surface, means are provided for again sampling the amplitude of the output transducer output and comparing the developed touch-related amplitude samples with the stored reference samples. Means are provided for developing a signal representing the point of greatest difference, or if desired the greatest ratio, between the amplitudes of the reference samples and the touch-related samples and thus the timing of the touch-perturbed wave burst.

As mentioned above, a designer utilizing the present invention has a free choice in tailoring the touch panel specification to the standards of a device driven by the panel. That is, the sampling means can be adjusted and designed to sample at any selected time interval to correspond to the standards of the driven device. For example, if the touch panel apparatus drives a computer, the sampling frequency may desirably be selected to correspond to every character or every other character for which the computer is programmed. Typical computers today have 640 matrix points along a horizontal line, corresponding to 80 characters. One would like to have touch resolution elements that have some integral relationship to the number 640, if the driven computer has 640 horizontal matrix points. There is nothing inherent in the output signal developed in accordance with the present invention that needs to be changed if one wishes to drive a computer having, instead, 512 matrix points (64 characters) along its horizontal axis. All that is required is that the timing of the electronic sampling signal be changed. This is not true of prior art fixed emitter systems because they cannot readily be changed to meet a different standard. Thus, in such prior art systems, a physically different touch panel would have to be provided for every standard desired to be met. With the present invention, only the timing of the sampling signal need be changed to accommodate a variety of different standards in the driven devices.

Yet another approach to analyzing the output from the output transducer to determine the timing of the perturbed wave burst is to provide differentiating means for differentiating the rectified output of the output transducer means. The zero crossing of the resulting signal represents the timing of the touch-perturbed wave burst. While the differentiating approach has the advantage that relatively inexpensive electronics can be utilized, the gratings employed in such a system must be very carefully tailored to insure that the burst components issuing from and intercepted by themwill enable the output transducer to produce a substantially flat output signal. Moreover, the differentiating approach is vulnerable to interpreting the presence of a contaminant (e.g., grease on the display surface) as a "touch".

Figure 3:
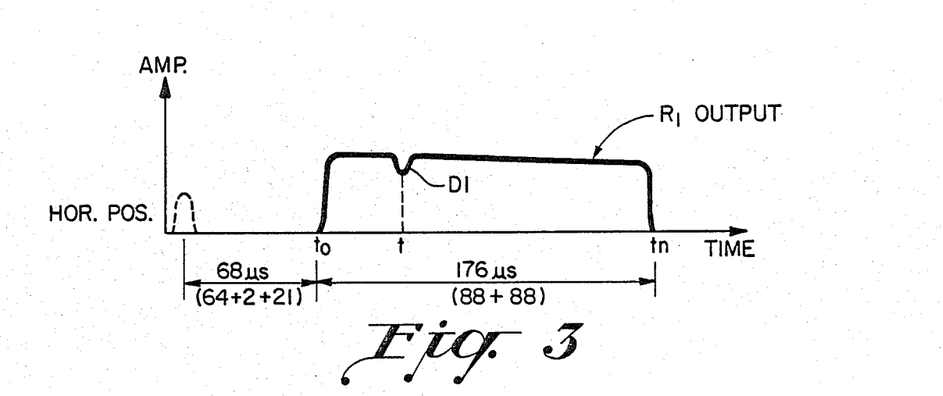
FIG. 3 is a graphical plot representative of received surface acoustic wave energy traversing one coordinate of the touch panel of FIG. 2.
Figure 4:
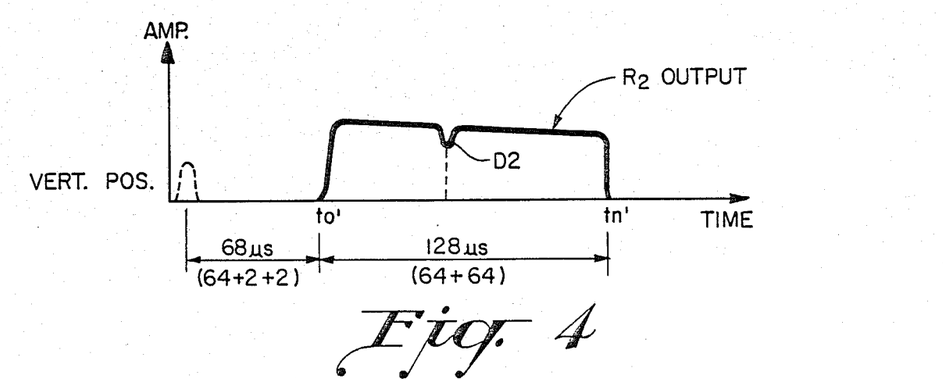
FIG. 4 is a graphical plot representative of received surface acoustic wave energy traversing a second, orthogonal, coordinate of the touch panel of FIG. 2.

The above described preferred embodiment (FIG. 2) is shiown as having reflective gratings G1, G2, G3 and G4, the elements of which are non-uniformly spaced. As already noted, in a practical embodiment this is desirable since a grating whose elements are uniformly spaced would reflect uniformly and thus produce an exponential fall-off in radiated power along its length. That is to say, if for each unit of length along the fixed grating, a fixed percentage of the power incident thereupon is radiated sideways, a smaller residue of power remains. If the same fixed percentage of that power is radiated in the succeeding section, it can be seen that the power decreases in a geometrical progression.

by way of review, desirably, a flat response such as is shown in FIG. 3, 4 or 8 is preferred. In accordance with an aspect of this invention, the reflectivity of the reflective elements constituting the reflective grating or gratings which adjoin the input transducer is weighted such that the initial elements have a relatively low reflectivity and the succeeding elements have increasing reflectivity. Stated in another way, the reflective array has an increasing coefficient of reflection in the direction away from the adjoining transducer so as to compensate for the fall-off in wave amplitude which results from the continuing diversion of wave energy into paths across the panel. It should be understood that the reflective array adjoining the input transducer should have increasing reflectivity in the direction of wave propagation, but for the array adjoining the output transducer, the array should have a corresponding decrease in reflectivity in the direction of wave propagation. Thus, in both cases, the reflectivity should increase in the direction away from the adjoining transducer. This desirable attribute is realizable in the FIG. 2 embodiment by virtue of the depicted non-uniform spacing of the reflective elements constituting each of gratings G1–G4.

For perfect uniformity of the transversely radiated surface wave power, and assuming no power loss by dissipation anywhere in the array, the power along the array must decrease linearly with distance. For this to occur, the power reflectivity must increase inversely with the distance remaining to the point beyond the array where the linearly decreasing power would drop to zero. (As used herein, reflectivity is the fraction of the longitudinally incident power diverted transversely per unit length.) In other words, power reflectivity K must increase with the distance x from the transducer in accordance with $$K = \frac{1}{G - x + 1/Ke}$$

where Ke is the maximum reflectivity actually used at the far end where x=G, the symbol G representing the length of the grating. Note that K and Ke have the dimension of a reciprocal length (fraction of power diversion per unit length).

There are a number of ways the reflectivity of the grating can be increased in the direction away from the adjoining transducer so as to flatten out the output waveform of the output transducer. One way would be to increase the thickness of the reflective elements in the direction away from the adjoining transducer, as the power reflectivity is proportional to the square of the thickness of the reflective elements. This could be done, in theory, by screen printing or etching (where grooves are used), however in practice this approach might prove to be difficult to execute.

A second, more practical, approach is to remove selected ones of the reflective elements in accordance with a formula which yields the desired increase in reflectivity along the array. See FIG. 9, also FIG. 2 and the earlier discussion concerning tailoring a reflective grating. For example, if one wished to cover a range of power reflectivity variation of 9 to 1 (an amplitude ratio of about 3 to 1), one would eliminate two of every three strips at the beginning of the array. Strips would be gradually added (fewer strips eliminated) along the length of the array until at the end of the array, no strips would be eliminated. This is a practical method and has been reduced to practice successfully.

Figures 9, 10:
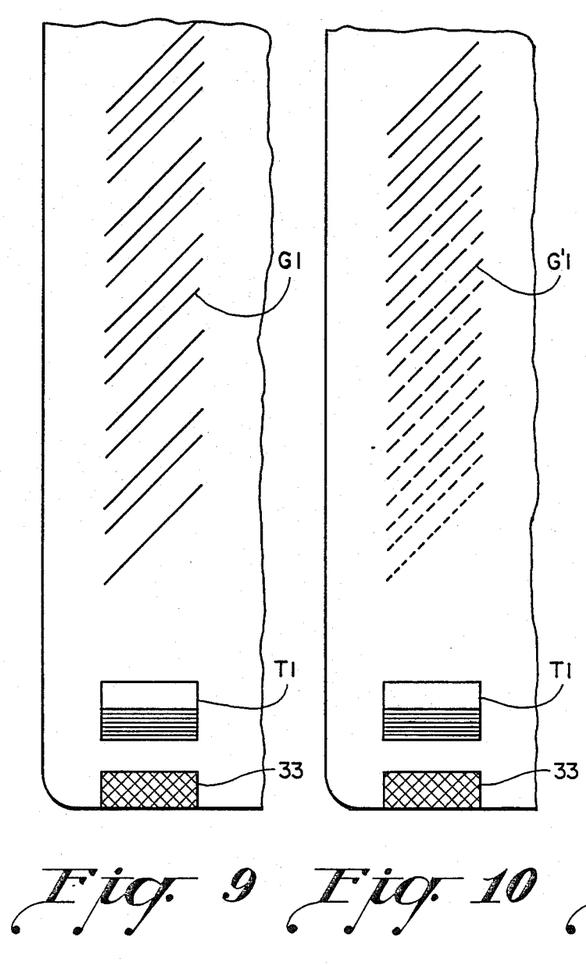
FIG. 9 is a schematic representation of a reflective array in which the pattern of elements results from "finger withdrawal"
FIG. 10 is a schematic representation of a reflective array in which individual elements are fragmented in a patterned fashion.

Yet another method involves weighting the reflectivity of each of the individual reflective elements, as shown schematically in FIG. 10 by fragmenting individual elements of an array G'1. The elements have greater interruptions (which may be produced according to a random formula) at the end of the array nearest the transducer (input or output) than at the opposite end of the array.

Figure 10A:
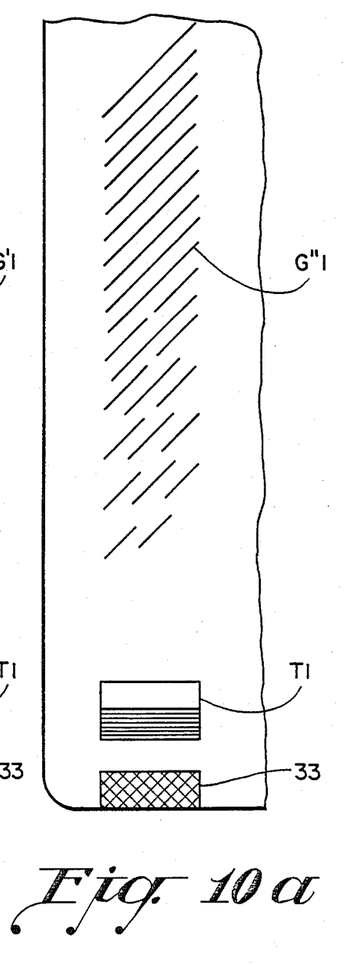
FIG. 10A is a schematic representation of a reflective array in which the length of individual elements increases in the direction away from the adjoining transducer.

In yet another embodiment (FIG. 10A), the reflective array G"1 has array elements whose individual length increases in the direction away from the adjoining transducer and whose individual position in a direction along the length of the element is varied within the side boundaries of the array. With all these methods, the reduction in element length $\rho$ corresponds to an equal reduction in amplitude of the reflected burst, and the power reduction, above referred to as K/Ke, equals $\rho^2$.

The same technique can be used, that is, weighting the reflective elements according to a prescribed reflectivity shading formula, to compensate for energy dissipation in the reflective array or other factors for which compensation may be desirable. The equation previously mentioned in connection with the preferred embodiment allows for uniform dissipation. Various other applications of the principles of the present invention will now be discussed.

Whereas the preferred embodiment is described as having separate input and output transducer means and means redirecting a burst of surface waves launched from an input transducer to a different output transducer, it is contemplated that the input transducer may also be the output transducer. See FIG. 11 wherein a reflector 60 is employed to reflect the waves launched by the common input/output transducer 61 back across the panel where they are redirected by a grating 62 back to the input/output transducer 61.

Figure 11:
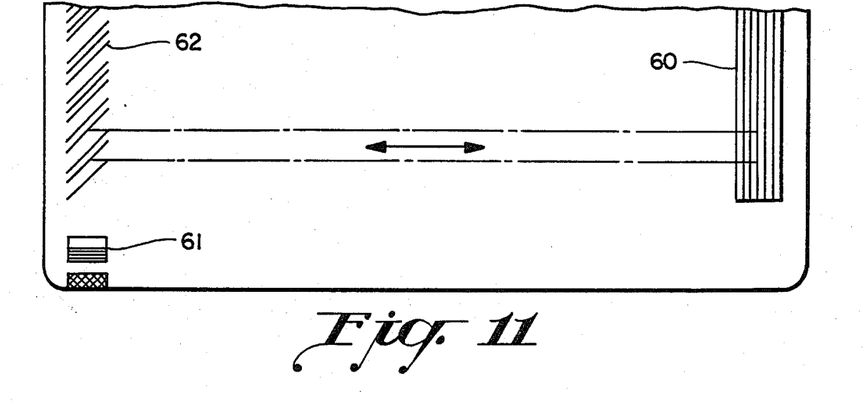
FIG. 11 is a schematic representation of a touch panel arrangement in which a single device is utilized as the input and output transducers.

The reflector 60 may consist of a series of half-wavelength spaced reflecting elements—either raised or depressed grooves—as is well known in the surface wave art.

Figure 12:
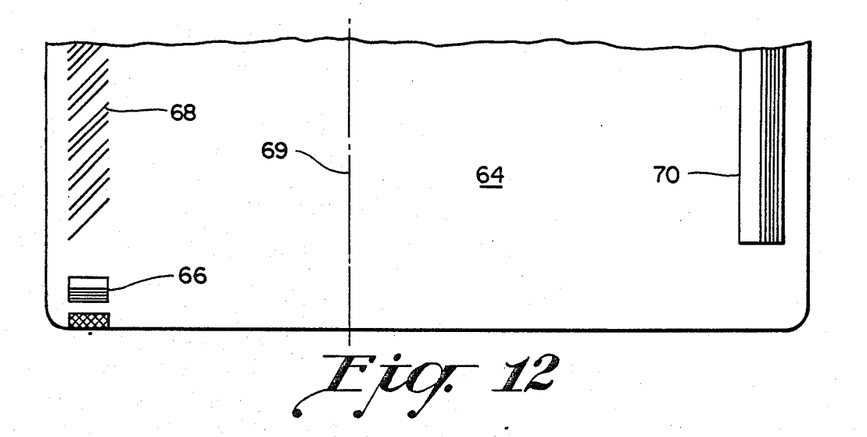
FIG. 12 is a schematic representation of a touch panel arrangement utilizing an output transducer coextensive with one coordinate of the panel.

FIG. 12 illustrates yet another embodiment of the invention comprising a substrate 64 to which is coupled an input transducer 66 for launching a burst of surface waves on the surface of the substrate 64. Surface wave redirecting means includes a grating 68 of the character of the gratings described above for redirecting surface wave burst components derived therefrom across the surface of the substrate 64 to output transducer means 70 along a plurality of paths of different lengths which are respectively associated with different positions along a coordinate axis on the display surface.

The FIG. 12 embodiment differs from other embodiments described in that the output transducer means 70 extends in the direction of the coordinate axis 69 and is of such length as to intercept each of the plurality of burst component paths. Circuit means (not shown) may be provided for initiating surface wave bursts on the surface and for detecting touch-induced perturbations of received wave burst components. It will be understood that unlike the other embodiments described, the varying component of the transit time of each of the surface wave burst components will only be half that in the aforedescribed embodiments. In the aforedescribed embodiments the variable part of the transit time of the surface wave burst component had an outgoing component and a returning component, whereas in the FIG. 12 embodiment, the surface wave burst component transit time has only an outgoing component. It is, of course, understood that the functions of input and output transducer may be interchanged.

Figure 13:
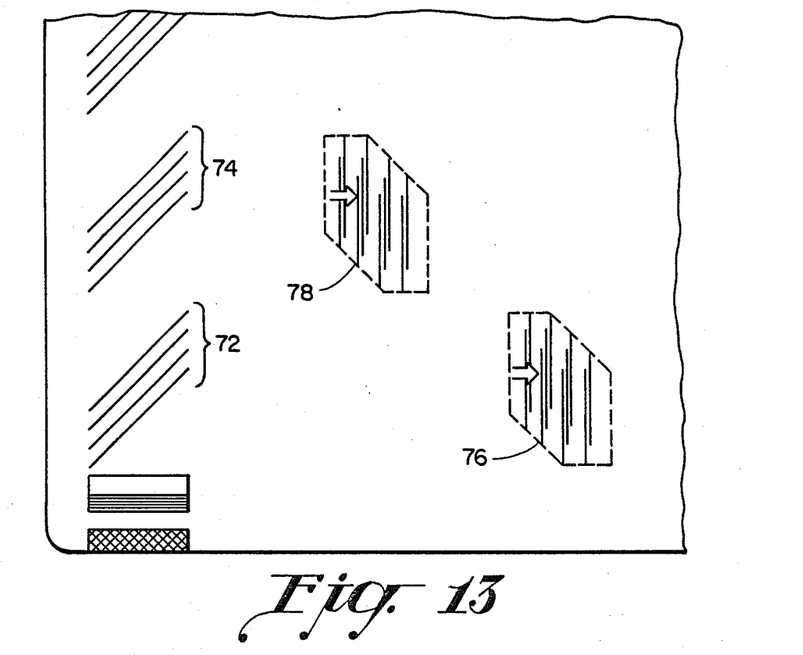
FIG. 13 is a schematic representation of a touch panel arrangement in which the surface wave reflective grating comprises discrete groups of reflective elements.

Yet another embodiment of the invention is shown schematically in FIG. 13. Whereas in each of the aforedescribed embodiments, the wave redirecting means, or reflective grating, is continuous, producing an analog output signal, in the FIG. 13 embodiment the wave redirecting means comprises discrete groups of wave reflective elements, two of which groups are shown at 72 and 74. The groups are spaced in the direction of the coordinate axis such that the paths of the surface wave burst components, shown schematically at 76, 78, are discrete and non-overlapping.

Figure 14:
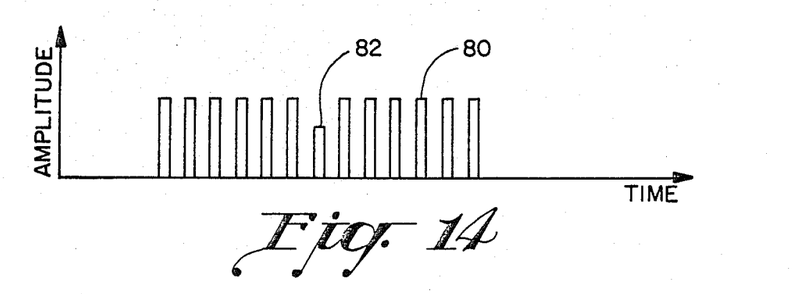
FIG. 14 depicts the pulse-type waveform developed by an output transducer responding to the burst components developed by the FIG. 13 embodiment.

The output of the output transducer (not shown), rather than being an analog signal as shown for example at 48 in FIG. 8, will have a pulse characteristic as shown, for example, in FIG. 14. in FIG. 14 the pulses 80 have a height which defines an envelope corresponding to the wave form 48 in FIG. 8. In FIG. 14, a pulse 82 of reduced height corresponds in time to the timing of a surface wave burst component which has been perturbed by its passage through a touched region on the surface of the touch panel apparatus.

Figure 15:
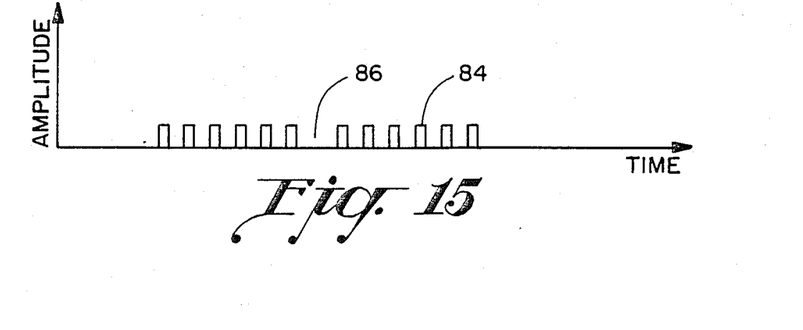
FIG. 15 depicts a variation of the waveform shown in FIG. 14.

In the FIG. 13 embodiment, circuit means (not shown) includes processing means for processingthe pulses and may develop a waveform such as shown in FIG. 15 consisting of a series of pulses 84 wherever the pulse height exceeds a predetermined threshold and a pulse void 86 corresponding to the missing pulse 82 (less than the threshold). The circuit means aforedescribed for initiating surface wave bursts on the surface and for detecting touch-induced perturbations of received wave burst components may include means for determining, by an analysis based on the timing of the detected pulse void associated with a perturbed wave burst component or by counting the pulses preceding the void, which of the plurality of paths was traversed by the touch-perturbed wave burst component and thus the location of the touch along the coordinate axis of the display surface.

Figure 16:
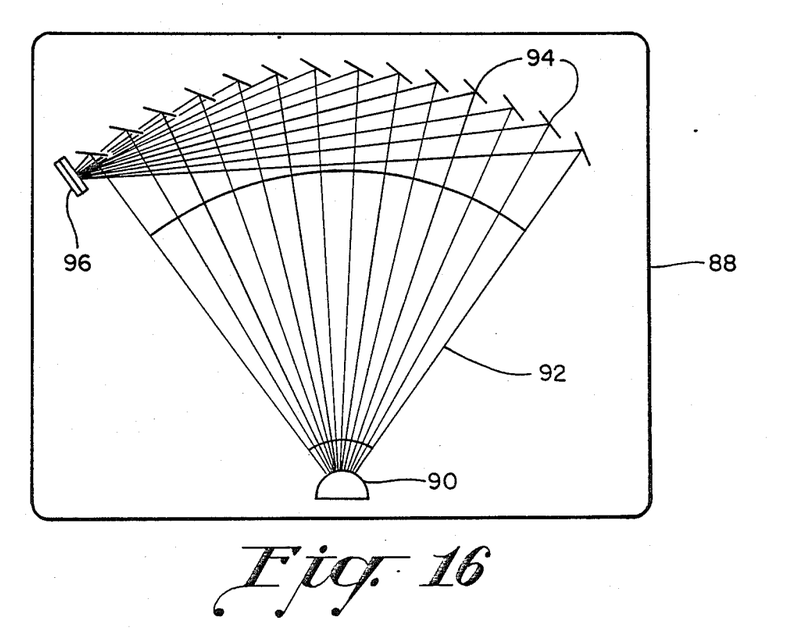
FIG. 16 is a schematic representation of another embodiment of the invention featuring an angular coordinate system.

FIG. 16 illustrates yet another embodiment of the invention in which the coordinate axis is not linear, but rather is angular. Such a one-coordinate system (angle only) could be used, for example, on the cover of a conventional meter to initiate an action in response to the meter reading. The FIG. 16 embodiment, which shows such a system in highly schematic form, comprises a display substrate 88 coupled to which is an input transducer 90 for launching circular surface waves which radiate outwardly across a display surface having angular coordinate markings 92 from the apparent center point of the angular coordinate system. Surface wave redirecting means in the form of a series of discrete reflectors 94 redirect the wave components derived from the burst to an output transducer 96 along a plurality of paths of different lengths which are respectively associated with different angular positions on the display surface. Circuit means similar to that described above, coupled to the input and output transducer means 90, 96 for initiating surface wave bursts on the surface of the substrate 88 may be provided. As for the above described embodiment, the circuit means includes means for determining by an analysis of the transit time of a detected perturbed wave burst component, which of the plurality of radial paths was traversed by the touch-perturbed wave burst component, and thus the angular location of the touch along the angular axis of the display surface.

The FIG. 16 embodiment illustrates that the principles of the invention may be employed in a system in which the redirecting means does not redirect the surface waves across the display surface for detecting a touch, but rather intercepts the surface waves after they have traversed the display (touch) surface. It is, however, understood that the functions of input and output transducers may be interchanged, and if that is done, the redirecting means 94 functions to redirect the surface waves, now generated by transducer 96, onto radial paths across the display surface toward transducer 90. As in each of the above embodiments, an output signal will be developed which reveals a perturbation associated with a touch of the display surface, and the timing of which perturbation signifies, or can be processed to signify, the position of the touch on the panel along the predetermined coordinate axis.

Still other embodiments and implementations of the present invention are contemplated and are within the spirit and scope of this invention.

We claim:

1. In a touch control system for a display panel or other touch-controlled device which is capable of recognizing touch positions along a predetermined coordinate axis on a touch surface, the apparatus comprising:
   a substrate having a touch surface capable of propagating surface acoustic waves such that a touch on said surface causes a perturbation of a surface wave propagating through the region of the touch;
   input surface wave transducer means acoustically coupled to said touch surface of said substrate and utilizable, when excited, for launching surface acoustic waves on said touch surface along a first path on said surface; and
   means including an array of surface wave reflective elements formed on said touch surface of said substrate along said first path for deriving from said surface acoustic waves a plurality of different wave components, each component being reflected from said array at a different location along the array, and for directing said components across said touch surface of said substrate in a progression of paths transverse to said coordinate axis;
   said array of elements comprising strips of a frit composition deposited on said touch surface.

2. A display device comprising an image viewing surface and at least one raised SAW-reflecting element formed of a frit composition and secured to said surface.

3. Apparatus as in claim 2 wherein said frit composition comprises about 10% by weight of a nucleation-accelerating additive.

4. Apparatus as in claim 3 wherein said nucleation-accelerating additive is a refractory material.

5. Apparatus as in claim 4 wherein said refractory material is a powder.

6. Apparatus as in claim 5 wherein said refractory powder is zirconium oxide.

* * * * *